United States Patent

Sosalla

[15] 3,640,345
[45] Feb. 8, 1972

[54] FOLDABLE HARROW CART

[72] Inventor: Harry Sosalla, Sac City, Iowa
[73] Assignee: Noble Manufacturing Company
[22] Filed: Sept. 8, 1969
[21] Appl. No.: 855,840

[52] U.S. Cl. ............................... 172/311, 172/456, 280/412
[51] Int. Cl. ..................................................... A01b 65/02
[58] Field of Search ................. 172/310, 311, 313, 314, 452, 172/456, 458, 459, 460; 280/411, 412, 413

[56] References Cited

UNITED STATES PATENTS

| | | | |
|---|---|---|---|
| 3,539,016 | 11/1970 | Bauer et al. | 172/456 |
| 2,095,417 | 10/1937 | Messersmith | 280/411 |
| 2,778,182 | 1/1957 | Malmgren | 280/411 |
| 2,828,597 | 4/1958 | Moore | 280/411.1 |
| 3,162,459 | 12/1964 | Marmorine et al. | 280/413 |
| 3,428,333 | 2/1969 | Nelson | 172/456 |
| 3,491,836 | 1/1970 | Doepker | 172/456 |

Primary Examiner—Robert E. Pulfrey
Assistant Examiner—C. W. Hanor
Attorney—Hofgren, Wegner, Allen, Stellman & McCord

[57] ABSTRACT

A foldable sectional tow-type implement, including a wheel cart having a centrally located drawbar revolvably mounted on a horizontal axis extending transversely of the direction of travel, and a pair of outboard sections interconnected to the centrally located drawbar and each being revolvable with the drawbar and swingable in a fore-and-aft direction relative thereto when revolved to a vertical transport position. Each of the drawbars serves to support an earthworking tool so that when the drawbars are in an operative position, the earthworking tools engage the surface of the ground and when the drawbars are swung to an inoperative position, the associated earthworking tools are raised to an inoperative or transport position. Flexible retaining members connect and support the outboard sections to the cart forward of the sections when the implement is in its operative position. The retaining members may be released when the tools are in the raised inoperative position to permit the outboard sections to be folded. The mechanism for revolving the drawbars and raising the tools is wholly independent of the release mechanism for the retaining members. The flexible retaining members are connected to an elongate release member pivotally connected to the cart in front of the sections. The elongate member has a hinge intermediate the ends thereof to permit the member to fold at least partially during folding movement of the end sections to prevent the flexible retaining members from rising into entanglement with portions of the tools in their folded positions.

9 Claims, 7 Drawing Figures

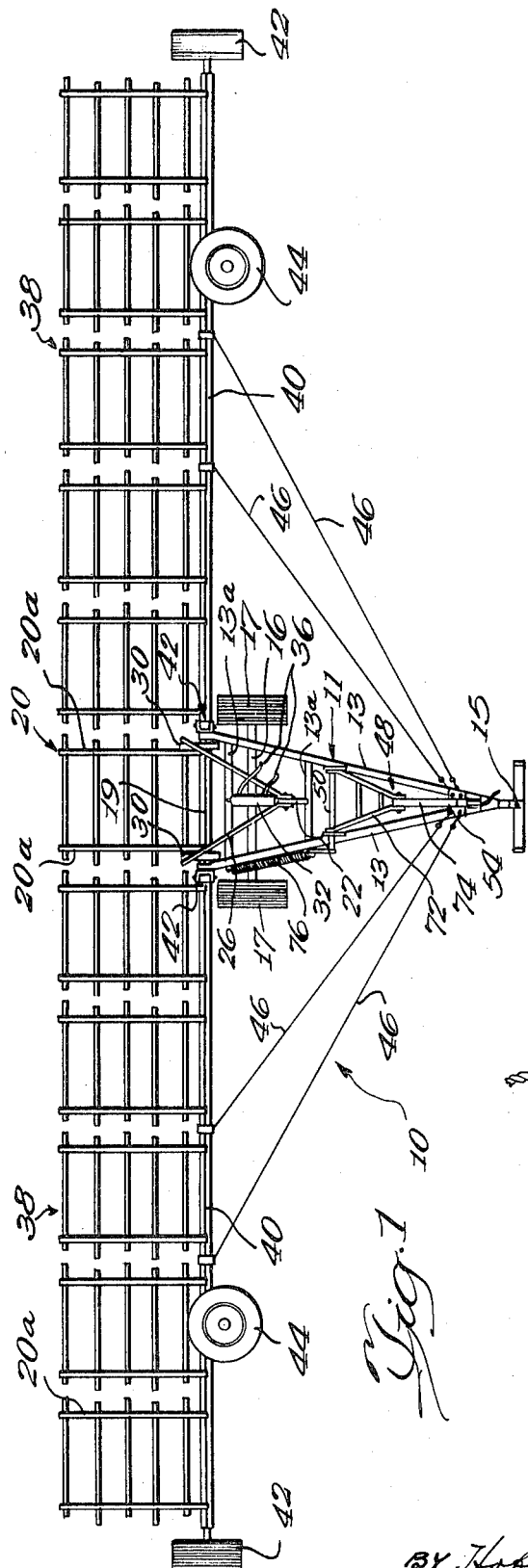

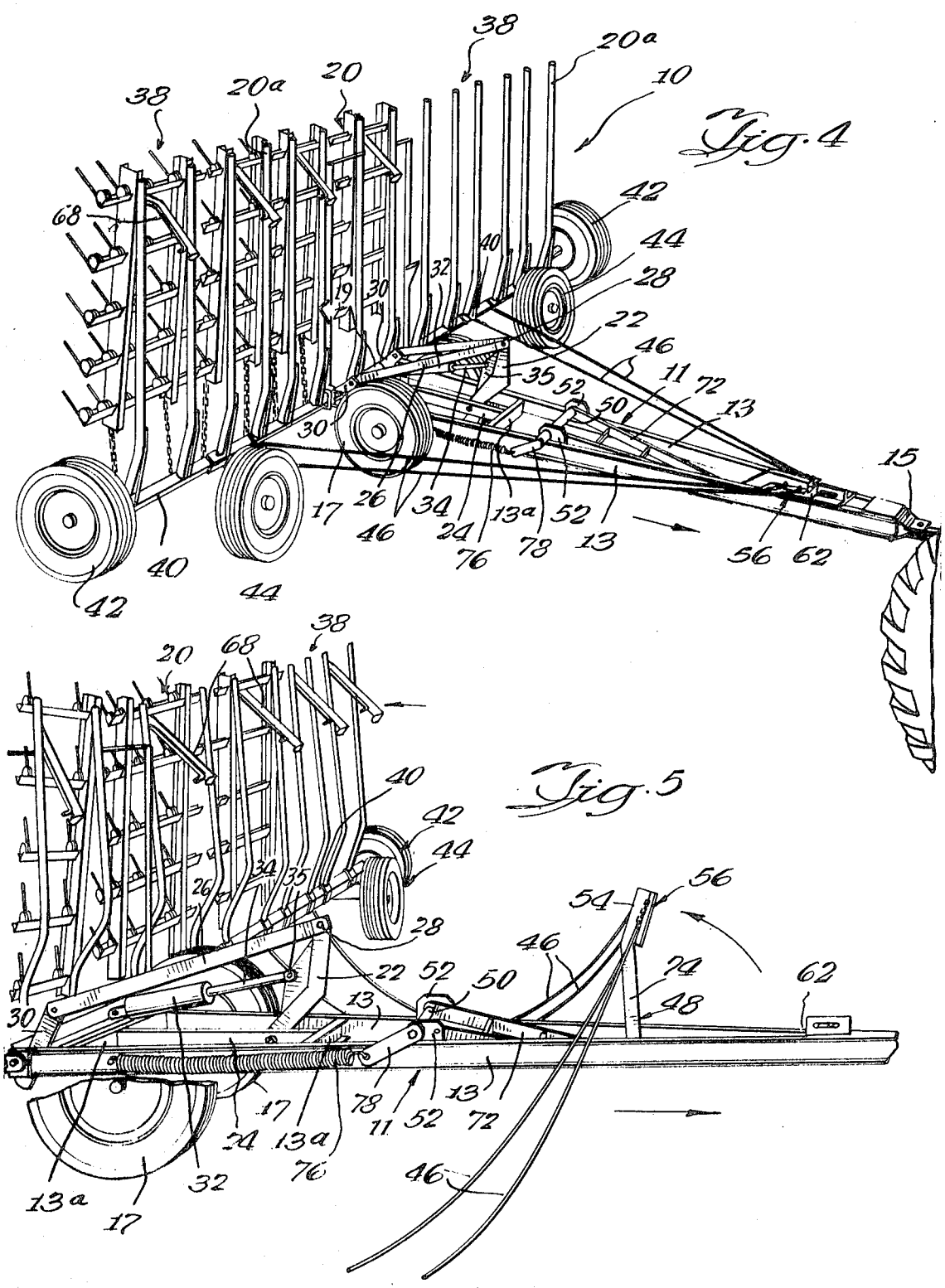

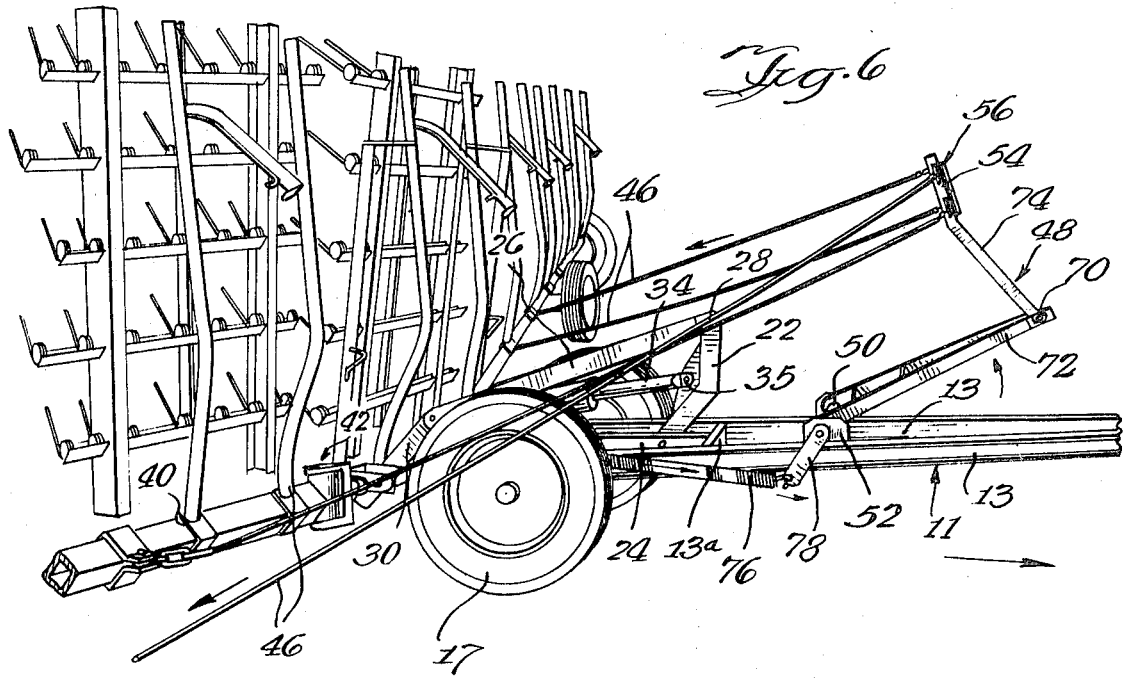
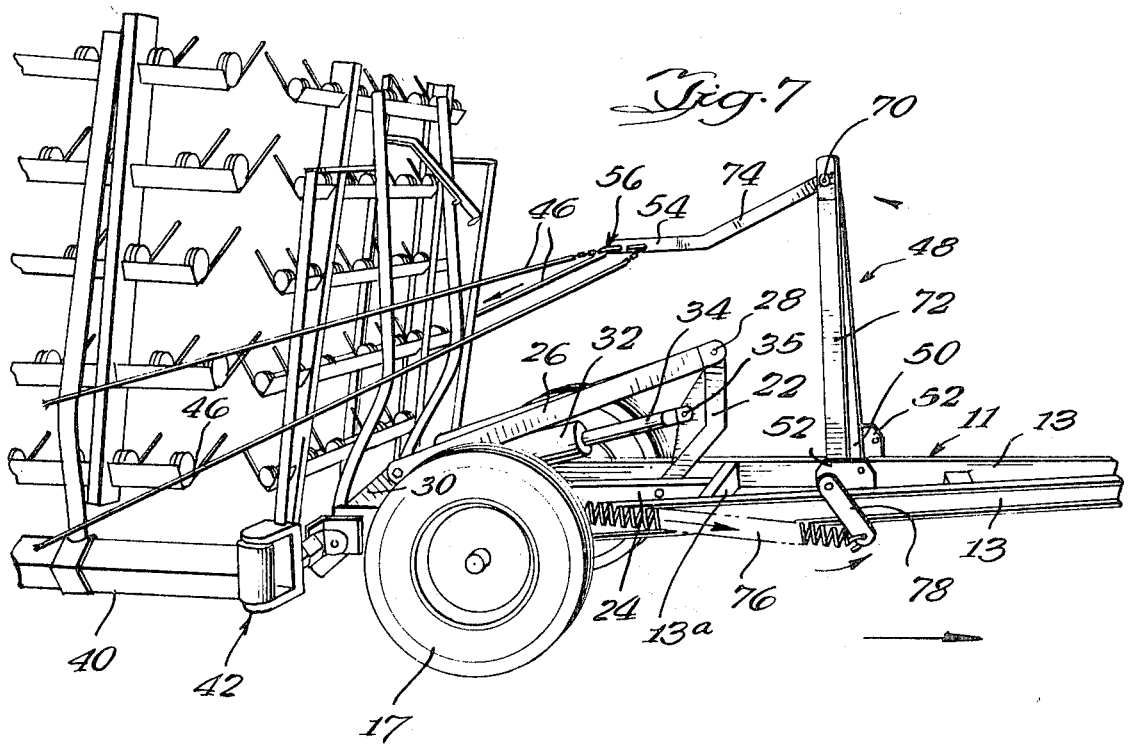

3,640,345

FOLDABLE HARROW CART

BACKGROUND AND SUMMARY OF THE INVENTION

This invention relates to a sectional tow-type implement cart which has at least a pair of outboard sections which are movable from a laterally extending operative position to a folded inoperative or transport position with the outboard sections extending generally parallel to the direction of travel.

Power-folded sectional tow-type implements are being used extensively by farmers, and such power-folding implements fall into two general classifications: those which require an operator to dismount from the tractor to manually release the foldable outboard sections after they have been revolved to a raised inoperative position so that they may be folded, and those which permit an operator to shift the various sections between operative and transport positions without dismounting from the tractor.

Exemplary constructions of the first type may be seen by reference to such U.S. Pat. as Clark, No. 2,944,615; Marvin, No. 2,973,818; and Gellner, No. 3,086,598. Each of these foldable structures require the operator to dismount from his tractor to release the outboard sections.

The U.S. Pat. to French Nos. 3,122,210 and 3,173,497 show exemplary structures of the second type wherein the raising and lowering of the outboard sections and the folding and unfolding of those sections are accomplished without the operator dismounting from the tractor. The disadvantages of the prior art structures of the second type, referred to above, are that release of the retaining means which connects and supports the outboard sections to the mobile cart are actuated or conditioned for folding in response to the revolving or raising of the outboard sections. The problem with such structures is that it is often necessary to raise and lower the ground-engaging tools for the purpose of removing debris or caked dirt therefrom. When this is done, the folding or unfolding of the outboard sections to a transport position obviously is not an object. Thus, with such prior art structures, each time the operator wishes to clean the ground-engaging tools by raising the implement sections, he, of necessity, also releases the retaining means connecting and supporting the outboard sections to the mobile cart connected to the rear of the tractor.

Therefore, a principal object of this invention is to provide a new and improved foldable sectional tow-type implement wherein an operator may shift the various sections between operative and transport positions without dismounting from his tractor.

Another object of the invention is to provide a mobile foldable sectional working implement of the character described in the preceding paragraph which includes a mobile cart for travel over the ground, the cart being adapted for connection to a prime mover such as a tractor and including a frame drawbar revolvably mounted on the cart and extending transversely of the forward direction of travel. The drawbar revolves about an axis transverse to the direction of travel so as to move the outboard sections from a generally horizontal operative position of ground engagement by the earthworking tools carried thereby to a generally vertical inoperative or transport position extending upwardly from the horizontal axis. A hydraulic power means is provided on the mobile cart for revolving the drawbars about the horizontal axis to permit folding of the outboard sections. A retaining means connects and supports the outboard sections to a portion of the mobile cart forward of the drawbar to support the outboard sections in a horizontal direction against rearward movement when the outboard sections are in their horizontal operative, ground-engaging position. The retaining means is operative to permit the outboard sections to be folded when in their vertical transport position without disconnecting the retaining means from the cart or from the outboard sections. In addition, the retaining means is released and latched totally independently of the power means which revolves the drawbar.

A further object of the invention is to provide an implement as set forth in the preceding paragraph wherein the retaining means includes a pair of flexible cables connected between the carts and the outboard sections, a first latch means on the cart, a cooperating second latch means on the forward ends of the cables to releasably connect the cables to the cart, with the second latch means being mounted on the cart for front-to-rear movement to permit folding and unfolding of the outboard sections independently of the hydraulic power means. The second latch means is shifted forwardly on the cart automatically as a result of unfolding of the outboard sections. Means are provided operative by an operator from the tractor seat to unlatch the first and second latch means to permit folding of the outboard sections.

An additional problem encountered with foldable section implements of the character described, wherein the flexible retaining means for supporting the outboard sections in their horizontal operative position are connected to the mobile cart and which remain connected to the cart and the outboard sections during folding and unfolding of the implement, is that the flexible cables have a tendency to become entangled with portions such as the adjustable levers of the tools which protrude outwardly from the tools when in the folded position.

Another object of this invention is to provide a means to avoid raising the flexible retaining members to positions of entanglement with the folded tools as the outboard sections are folded.

A further object of the invention is to provide an implement as set forth in the preceding paragraph which includes an elongated rigid release member pivotally connected at one end to the mobile cart in front of the revolvable drawbar and connected at the other end to the flexible cables. The release member is pivotal generally between a horizontal position forward of the pivotal connection therefor to retain the outboard sections in their operative horizontal position and a generally vertical position above the pivotal connection when the outboard sections are completely folded. The elongate release member is hinged intermediate the ends thereof to permit folding thereof at least partially during the folding movement of the outboard sections to prevent the cables from rising into entanglement with portions of the tools in their folded positions. The hinge means defines an elbow with a lower portion of the release member disposed vertically above the pivotal connection with the cart, when the implement is folded, and an upper portion extending rearwardly at an angle to the lower portion with the cables connected to the free end of the upper portion.

Other objects, features and advantages of the invention will become apparent from the following detailed description taken in connection with the accompanying drawings.

DESCRIPTION OF THE DRAWINGS

FIG. 1 is a top plan view of the mobile implement of the present invention in the extended operative position;

FIG. 2 is a perspective view of the latch means between the flexible retaining cables and the forward portion of the mobile cart;

FIG. 3 is a section taken generally along the line 3—3 of FIG. 2;

FIG. 4 is a perspective view of the mobile implement of the present invention with the sections thereof raised to the vertical inoperative position, and with the latch means still securing the retaining cables to the forward end of the mobile cart;

FIG. 5 is a perspective view similar to that of FIG. 4 with the implement in a first position of folding;

FIG. 6 is a perspective view similar to that of FIG. 5 with the implement in a successive or sequential position of folding; and FIG. 7 is a perspective view similar to that of FIG. 6 with the implement in the fully folded, transport position.

DETAILED DESCRIPTION OF THE INVENTION

Referring to the drawings in greater detail, the invention is illustrated herein as embodied in a tow-type foldable sectional implement, designated generally by the numeral 10 in FIG. 1. The implement 10 includes a fore-and-aft extending mobile wheel cart, generally designated 11. The cart 11 is comprised of a cart frame including a pair of fore-and-aft extending frame members 13 which are rigidly interconnected at their forward end where a hitch 15 is connected. The frame members 13 diverge rearwardly and are interconnected by a pair of cross frame members 13a which extend between the frame members 13. An axle housing 16 extends transversely of and is connected to the frame members 13 and houses the axle of a pair of ground-engaging wheels 17 for the mobile cart 11.

The rear ends of the frame members 13 have appropriate bearing means for revolvably supporting an elongate transversely extending center drawbar 19 of a center section, generally designated 20. This center section includes a plurality of spaced-apart elongate tool bars 20a for securing an earth-engaging tool or implement such as spike-tooth harrows, tine-tooth harrows, rotary hoes, or the like. The center drawbar 19 is revolvable through an arc of approximately 90° between a lowered operative position as illustrated in FIG. 1 to an elevated inoperative position as shown best in FIG. 4. It will be noted that when the drawbar 19 is revolved to the lowered operative position, the center section 20 carried thereby will be in a horizontal position so that the tools carried thereby will engage the surface of the earth. Similarly, when the drawbar 19 is revolved to the elevated inoperative position, the center section 20 will be disposed in an upright position vertically above the drawbar.

Means are provided for revolving the center drawbar 19 about its longitudinal axis between the operative and inoperative positions and this means comprises a linkage which includes an actuating lever 22 pivotally mounted on a frame element 24 which extends between the cross frame members 13a, for fore-and-aft swinging movement of the actuating lever 22 about a substantially horizontal transverse axis. The upper end of the actuating lever 22 is pivotally connected to the forward end of a motion-transmitting link structure 26 by pivot 28. The rear end of the motion-transmitting link structure 26 is pivotally connected to a pair of arms 30 which are fixed to the center drawbar 19.

Means are provided for power shifting this linkage and includes a fluid pressure piston and cylinder unit comprising a cylinder 32 which is pivotally connected at one end to the rear cross frame member 13a to permit pivoting movement about a substantial horizontal transverse axis. The cylinder 32 has a piston movable therein which is connected to a piston rod 34 (FIG. 4) that projects exteriorly therefrom. The piston rod extends forwardly and is pivotally connected to the actuating lever 22 by pivot 35. This hydraulic unit is of the double-acting type and a pair of conduits 36 (FIG. 1) are connected in communicating relation to opposite end portions of the cylinder 32 and are connected to a source of fluid under pressure in a known manner through appropriate valve controls to permit selective extension and retraction of the piston rod. The controls for operating the hydraulic system are located on the tractor as is conventional, and it will be seen that the center section may be effectively revolved between the operative and inoperative position.

A pair of elongate outboard or end sections, generally designated 38, are each connected to one end of the center section 20 and each outboard section includes an outboard drawbar 40. The means which interconnects the center drawbar and the outboard drawbars are universal joints, generally designated 42 and best illustrated in FIG. 7, which permits a universal action between the interconnected drawbars. It therefore will be seen that the outboard drawbars 35 are capable of a floating action when in the lowered operative position to accommodate irregular ground surfaces.

It should be pointed out that the outboard sections 38 of the embodiment of the invention shown in the drawings also include a plurality of elongate tool bars 20a for securing earth-engaging tools or implements. In the embodiment shown in the drawings, the outboard sections 38 have a greater number of tool bars 20a than the center section 20 so as to secure a greater number of tools (five are shown in the drawings) than the center section 20.

These outboard sections 38 are shiftable between an operative extended lowered position as shown in FIG. 1 and an inoperative folded elevated position shown in FIG. 4. FIG. 7 shows the outboard sections extending rearwardly from the mobile cart 11 in a conventional folded, transport position. It will be noted that when the outboard sections 38 are in the operative position, the drawbars 40 thereof are coextensive with the drawbar 19. The outboard drawbars also are revolvable with the center drawbar 19 so that the respective tool frames carried thereby will be raised and lowered as the drawbars 40 are selectively revolved.

When the outboard sections are in the lowered operative position, the outermost end of each section is supported by a ground-engaging wheel 42 journaled in the outer ends of the drawbars 40. It therefore will be seen that the inner end of each drawbar 40 is supported by its universal connection 42 with the center drawbar 19, and is supported at its outer end by the ground-engaging wheel 42.

The ground-engaging wheels 42, however, are shifted out of engaging relation with respect to the surface of the ground when the associated drawbar 40 is revolved to the inoperative position, and the outer end of each outboard drawbar is provided with a transport wheel 44, which as shown engages the surface of the ground when the associated drawbar 40 is in the transport position. However, this transport wheel is disposed out of engagement with respect to the surface of the ground when the associated drawbar is in the inoperative extended position.

A retaining means is connected between the outboard sections 38 and the forward end of the mobile cart 11 and this means comprises a pair of elongate flexible cables 46 connected to each of the outboard drawbars 40 intermediate the ends thereof and extending forwardly therefrom for connection to an elongate cable release member, generally designated 48. When the implement is in the lowered, horizontal operative position, the cables 46 support the outboard sections in a horizontal direction against rearward movement as the earth-engaging tools move along the ground. The cable release member 48 is pivotally connected at its rearward end by a pivot shaft 50 journaled in brackets 52 (FIG. 4) secured to the frame members 13. FIGS. 2 and 3 show in detail the means for connecting the forward ends of the flexible cables 46 with the forward end 54 of the release member 48. The connecting means includes a rectangular frame structure, generally designated 56, having four bolt members 58 to which is connected the forward ends of the flexible cables 46 by chain-link-type members 60.

The cable release member 48 is held downwardly in a generally horizontal position (as shown in FIGS. 1 through 4) by a latch means which includes a first latch means being the front cross portion 56a of the rectangular frame structure 56 on the forward end of the release member 48 and a second latch means being a reciprocating latch tongue member 62 which is biased by a spring 64 rearwardly so that the tongue overlies the cross frame piece 56a to hold down the release member 48. To fold the implement 10 after the ground-engaging tools are raised to the aforesaid inoperative position, the tongue 62 is pulled forwardly against the biasing of 64 by means of a rope or like means 66 leading up to the tractor seat for grasping by the driver. The release member 48 then is released and the outboard sections 38 may fold rearwardly as seen in FIG. 7 with the flexible cables 46 moving therewith as the release member 48 pivots about shaft 50.

As previously mentioned, problems heretofore have been encountered by the flexible cables 46 becoming entangled with levers 68 (FIG. 4) protruding upwardly or outwardly from the ground-engaging tools or implements. To eliminate this problem, the release member 48 of this invention is hinged as at 70 intermediate the ends thereof to permit the release member to fold at least partially during folding movement of the outboard sections rearwardly. The hinge defines an elbow, as seen in FIG. 7, when the outboard sections 38 are folded, with a lower portion 72 of the release member disposed vertically above the pivot shaft 50 and an upper portion 74 extending rearwardly at an angle to the lower portion 72, with the flexible cables 46 connected to the free end of the upper portion 74 at a point below that which would cause entanglement with the ground-engaging tool handles 68. Thus it can be seen that the hinged release member 48 provides sufficient vertical and rearward movement of the cables by the pull of the front ends of the cables 46 on the release members to allow for the outboard sections 38 to be folded, but the hinge means 70 maintains the cables 46 at a low disposition to prevent entanglement of the cables with the tool handles 68.

A coil spring 76 is connected at one end to the rear of the mobile cart 11 and at its other end to a lever member 78 which is fixed for pivotal movement with the release member 48 so as to increasingly load the spring when pulled rearwardly by the cables. This spring provides a biasing means to return the hinged cable release member 48 from the position shown in FIG. 7 to the FIG. 5 position where gravity swings portion 74 into the latched position shown in FIGS. 1–4 when the outboard sections 38 are unfolded and returned to their horizontal, inoperative position. As the front crosspiece 56a of the connecting means 56 for the front end of the cables 46 descends into engagement with the latch tongue member 62, it engages the inclined surface of the latch tongue and forces the tongue against the biasing of spring 64 until the crosspiece 56a seats under the tongue, providing automatic latching of the release member 48 as a result of unfolding the outboard sections 38.

During operation of the implement, the hitch 15 will be connected to a prime mover such as a tractor, and the implement will be towed therebehind. If it is assumed that the implement is in the operative position, the piston rod 34 will be retracted so that the actuating lever 22 is disposed in the position illustrated in FIG. 4. The drawbars 40 will be coextensive and coaxial with the center drawbar 19 and the respective tool frames will be in a horizontal position so that the tools carried thereby will engage the earth to be worked. In this position, the outer ends of the outboard sections will be supported for travel by the ground-engaging wheels 42 and the universal joint between the outboard drawbars 40 and the center drawbar 19 permits a floating action to take place therebetween to accommodate irregularities in the terrain.

When it is desirable to shift the implement to the transport position, the operator of the tractor will actuate the controls located on the tractor whereby the piston rod 34 will be extended to the position shown in FIGS. 5–7 to shift the actuating lever 22 in a forward direction. This movement is transmitted through the transmitting link 26 to the center drawbar 19 to rotate the latter and also to produce revolving movement in the forward direction with respect to the outboard drawbars 40. Rotation of the drawbars in this direction elevates the tools associated with the center drawbar and also elevates the tools associated with the outboard drawbars. The transport wheels 44 will be rotated from their raised positions to a ground-engaging position while the ground-engaging wheels 42 will be moved out of engaging relationship with respect to the ground.

With the tools in their raised inoperative position, the operator of the tractor will pull on the rope 66 to move the tongue 62 from its latched position over the cross frame piece 56a on the forward end of the cable release member 48, and the cables 46 will be in an untensioned condition to permit swinging movement of the outboard sections 38 to the rearward folded position upon forward movement of the tractor or prime mover, as seen in FIG. 7.

When it is desirable to shift the implement into the operative lowered position, it is merely necessary for the operator to drive the tractor rearwardly whereby the transport wheels will shift the outboard sections to the extended position and the cable release member 48 will automatically latch under the tongue 62. The operator then actuates the hydraulic cylinder unit to retract the piston rod thereof so that the center drawbar and outboard drawbars are revolved to allow the tool frames to be lowered.

The foregoing detailed description has been given for clearness of understanding only and no unnecessary limitations should be understood therefrom as some modifications will be obvious to those skilled in the art.

I claim:

1. In a mobile foldable sectional implement which includes a mobile cart for travel over the ground, said cart being adapted for connection to a prime mover and including a frame having tool-carrying means and revolvably mounted on the cart and extending transversely of the direction of travel and being revolvable about an axis transversely of the direction of travel for movement between a generally horizontal operative position and a generally vertical inoperative or transport position with the tools extending upwardly from said axis, said tool-carrying means having a central section and a pair of end sections, the end sections being hinged to the central section for swinging movement relative to the central section to a rearward folded position in angular relation to the central section when the frame is in said vertical transport position, and power means on said cart for revolving said frame about said axis to permit folding said end sections, the improvement comprising retaining means connected between said end sections and a release member on said cart forward of said sections to support the end sections in a horizontal direction against rearward movement when the end sections are in said horizontal operative position, and means totally independent of said power means for releasing said retaining means and said release member to permit said end sections to be folded when in said vertical transport position without disconnecting the retaining means from the cart or the end sections, folding of said end sections relative to said cart pulling on and moving said retaining means and said release member after release thereof totally independently of said power means.

2. The implement of claim 1 wherein said retaining means includes a pair of flexible cables connected between said cart forward portions and said end sections, first latch means on said cart forward portions and cooperating second latch means on the forward end of said retaining means to releasably connect the cables to the cart forward positions, said second latch means being mounted on the cart for front to rear movement to correspondingly move the front ends of said cables and thereby permit folding and unfolding said end sections independently of said power means.

3. The implement of claim 2 including means causing said second latch means to move forwardly on said cart automatically as a result of unfolding said end sections.

4. The implement of claim 3 including means operative from an operator's position on said prime mover to unlatch said first and second latch means to permit folding said end sections.

5. In a mobile foldable sectional implement which includes a mobile cart for travel over the ground, said cart being adapted for connection to a prime mover and including a tool-carrying means revolvably mounted on the cart and extending transversely of the forward direction of travel and being revolvable about an axis transversely of the direction of travel for movement between a generally horizontal operative position and a generally vertical inoperative or transport position with the tools extending upwardly from said axis, said tool-carrying means having a central section and a pair of end sections, the end sections being hinged to the central section for swinging movement relative to the central section to a rearward folded position in angular relation to the central section when the frame is in vertical transport position, and a pair of elongate, flexible members each having one end thereof connected with one of said end sections, the improvement comprising an elongate rigid release member pivotally connected at one end to said cart in front of said sections and connected at the other end to the other end of at least one of said flexible members, said release member being pivotable generally between a horizontal position forward of said pivotal connection to retain the end sections in said unfolded position and a generally vertical position above said pivotal connection when the end sections are completely folded, said release member having hinge means intermediate the ends thereof to permit the release member to fold at least partially during folding movement of said end sections to avoid raising said flexible members into entanglement with portions of the tools in the folded position of the end sections.

6. The implement of claim 5 including biasing means connected between the cart and said release member urging said release member toward said forward horizontal position.

7. The implement of claim 5 wherein said hinge means defines an elbow on said release member when the end sections are folded, with a lower portion of said release member disposed vertically above said pivotal connection with the cart and an upper portion extending rearwardly at an angle to the lower portion, and with the flexible members connected to the free rear end of the upper portion of the release member.

8. The implement of claim 7 including biasing means connected between the cart and the lower portion of said release member urging the release member toward said forward horizontal position with the release member straightened out.

9. The implement of claim 8 including latch means for holding the upper portion of said release member down against the cart when said end sections are unfolded and thereby retain and support the end sections against horizontal rearward movement.

* * * * *